C. E. REED.
DRILL HEAD.
APPLICATION FILED MAY 10, 1920.
Reissued June 14, 1921. 15,126.
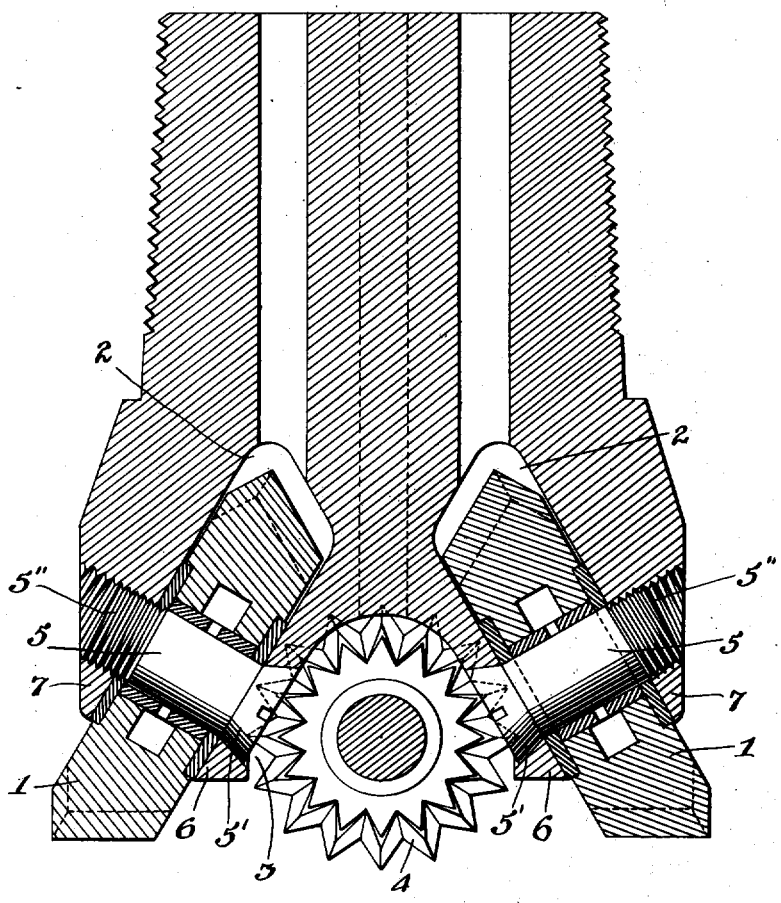
Inventor
Clarence E. Reed
By Spear, Middleton, Douglas & Hall
Attorney

UNITED STATES PATENT OFFICE.

CLARENCE E. REED, OF HOUSTON, TEXAS.

DRILL-HEAD.

15,126. Specification of Reissued Letters Patent. Reissued June 14, 1921.

Original No. 1,279,759, dated September 24, 1918, Serial No. 238,328, filed June 5, 1918. Application for reissue filed May 10, 1920. Serial No. 380,309.

*To all whom it may concern:*

Be it known that I, CLARENCE E. REED, a citizen of the United States, and residing at Houston, in the county of Harris and State of Texas, have invented certain new and useful Improvements in Drill-Heads, of which the following is a specification.

My invention is an improvement in the general type of drill for drilling wells shown for instance in Letters Patent of the United States, No. 1,120,198, December 8th, 1914, granted to Humason, and my invention concerns particularly the mounting of the journal pin on which the side cutters turn.

The invention is shown in the accompanying drawing which represents a vertical sectional view of the drill head.

This type of drill has cutters 1 arranged in recesses 2 extending upwardly and inwardly at an inclination or toward the vertical axis of the drill head, and the drill head has a central space 3 in which the main cutter 4 is located.

The cutters 1 turn about journal pins 5 which are fixed in the walls 6 and 7, defining the inner and outer sides of the slots 2.

These pins have conical heads 5′ and screw-threaded ends 5″ and in the improved arrangement I place the pins in position by inserting them from the recess 3 outwardly instead of inserting them from the outer side of the head, and of course the pins are placed before the main cutter member is positioned.

The wall 6 at the inner side of the slot 2 is provided with a conical seat for receiving the conical head 8 of the pin and the outer wall 7 of the recess is screw-threaded to receive the screw-threaded end of the pin.

In some prior constructions in which the pin was inserted from the outside of the drill head it has been customary to employ some safety device at the outer or headed end of the pin, such as a screw or pin to prevent the bearing pin from working out of place, but with my arrangement the pin cannot work out of place or drop out because of the presence of the main cutter, which extends across the inner headed end of the pin with its periphery working close thereto. Further the space at the outer bearing wall 7 which heretofore has been occupied by the safety device is with my arrangement available for threading to receive the screw-threaded end of the pin, and this, together with the extra thickness of the outer wall 7 in relation to the inner wall 6 gives a longer threaded seat to receive the threaded end of the pin than is possible under the old arrangement and thus a stronger tie is provided between these walls 6 and 7, and one which will be maintained because as above stated the pin cannot work out of place, this being prevented by the main cutter working close to the inner headed end of the pin. Furthe. the beveled head of the pin having a wider bearing contact with the thin inner wall 6 than is possible with a threaded connection acts to better sustain this wall and make a more reliable support to take the strains than under previous constructions in which the threaded end of the pin finds a comparatively short bearing in the said wall only a few threads being available.

With my improvement even though a journal pin might break the cutter will not be lost in the well for the reason that the pieces of the pin would still be held in place and thus retain the cutter, though of course the cutter might not function as intended and repairs would have to be made.

A double shearing or cutting of the pin on a straight line at the inner walls of the slot would be necessary to permit the cutter to drop out of the recess, and this is a possibility which is most remote as the leverage would cause the pin to break first near the wall of the slot nearest the axis of the drill head, and then the cutter would have enough play or lateral movement to prevent shearing the pin near the outer wall of the slot prior to the bit being withdrawn from the well.

What I claim is:

1. A drill having a head with a central recess and laterally disposed slots, rotary cutters in the slots, a main cutter in the central recess and journal pins for the rotary cutters extending across the slots and having their heads bearing against the inner walls of the slots adjacent the central cutter, and their outer ends bearing in the outer walls of the slots, said pins being inserted into place through the central recess of the drill head, substantially as described.

2. A drill having a head with a central recess and laterally disposed slots, rotary cutters in the slots, a main cutter in the central recess and journal pins for the rotary cutters extending across the slots and having their heads bearing in the inner walls of the slots adjacent the central cutter, and their outer ends bearing in the outer walls of the slots, said pins being inserted into place through the central recess of the drill head, said pin heads being of frusto-conical form and fitting corresponding seats in the said inner walls and having their outer ends threaded into said outer walls, substantially as described.

3. In a tool for deep well drilling, a head having means at the upper end thereof for attachment to a drill stem, a transversely extending recess in the lower end thereof opening out through the bottom of the same, and a second recess located between one of the longer sides of the first named recess and the periphery of the head, a disk cutter located in the second recess, a retaining and bearing pin for the disk cutter insertible into position through said first named recess, coöperating surfaces associated with the outer portion of the pin and the wall between the second recess and the periphery of the head for retaining the pin in posision, and a member adapted to be placed and held within the first named recess, in coöperative relation to the pin, after the latter has been inserted in position.

4. In a tool for deep well drilling, a head having means at the upper end thereof for attachment to a drill stem, a transversely extending recess in the lower end thereof opening out through the bottom of the same, a second recess located between one of the longer sides of the first named recess and the periphery of the head, and registering openings located respectively in the wall between the transverse recess and the second recess and between the latter and the periphery of the head, the axes of which extend upwardly and outwardly, a disk cutter located in the second recess, a retaining and bearing pin for the disk cutter having its end portions finding bearings in said openings and insertible in place through said transverse recess and a member placed and held within the transverse recess in coöperative relation to the pin after the latter has been inserted in position.

5. In a tool for deep well drilling, a head having means at the upper end thereof for attachment to a drill stem, a recess in the lower end thereof opening out through the bottom of the same, a second recess located between the first named recess and the periphery of the head, the middle portion of the wall between the second recess and the periphery of the head being materially thicker than the wall between the recesses, an opening having a threaded bore located in the middle portion of the first named wall and an unthreaded registering opening in the second named wall, a disk cutter located in the second recess and a retaining and bearing pin therefor insertible in place through the first named recess and having an upper threaded end portion coöperating with the threads of the first named opening, and an opposite end portion coöperating with the wall of the second named opening, and cutting members positioned and held in the first named recess after the pin has been inserted in position.

6. In a tool for deep well drilling, a head having in its lower end a recess opening out through the bottom thereof and a second recess located between the first named recess and the periphery of the head, the wall between the two recesses being thinner than the middle portion of the wall between the second recess and the periphery of the head, the first named wall having an opening extending therethrough and the second wall being provided with an alining opening, a portion of the wall of the second opening being threaded, a disk cutter located in the second recess, a retaining and bearing pin therefor insertible in place through the first named recess and having a threaded end portion engaging the threaded part of the wall of the second opening and having its opposite end portion coöperating with the first named opening, means for limiting the outward movement of the pin, and a member insertible and held in the first named recess after the insertion of said pin and in coöperative relation to the inner end of the latter for arresting the inward movement of the pin.

7. In a tool for deep well drilling, a head having in its lower end a recess opening out through the bottom thereof and a second recess located between the first named recess and the periphery of the head, the wall between the two recesses being thinner than the middle portion of the wall between the second recess and the periphery of the head, the first named wall having an opening extending therethrough and the second wall being provided with an alining opening, a disk cutter located in the second recess, a retaining and bearing pin therefor insertible in place through the first named recess and having end portions supported in said openings, coöperating surfaces on the second wall and pin for limiting the outward movement thereof and a member insertible and held within first named recess after the insertion of the pin and in coöperative relation therewith to arrest inward movement of the same.

In testimony whereof, I affix my signature.

CLARENCE E. REED.